April 26, 1960     P. DANNENMANN     2,934,116
FOOD TREATING DEVICE HAVING SAFETY DEVICE
Filed Feb. 10, 1955     2 Sheets-Sheet 1

INVENTOR
Paul Dannenmann
BY Michael S. Striker
ATTORNEY

April 26, 1960     P. DANNENMANN     2,934,116
FOOD TREATING DEVICE HAVING SAFETY DEVICE
Filed Feb. 10, 1955     2 Sheets-Sheet 2

United States Patent Office 2,934,116
Patented Apr. 26, 1960

2,934,116

FOOD TREATING DEVICE HAVING SAFETY DEVICE

Paul Dannenmann, Welzheim, near Schorndorf, Wurttemberg, Germany, assignor to G. Bauknecht G.m.b.H. Elektrotechnische Fabriken, Stuttgart, Germany Application February 10, 1955, Serial No. 487,433

Claims priority, application Germany February 12, 1954

7 Claims. (Cl. 146—68)

The present invention relates to treating apparatus.

More particularly, the present invention relates to a kitchen utensil by means of which a substance may be treated. The apparatus may be used as a mixer, disintegrator, or beater for mixing, disintegrating, or beating a substance to be used during cooking or, if desired, the apparatus may be used as a juice extractor by means of which the juice of citrus or other fruits may be removed.

There exist in the art treating apparatus for accomplishing the above missions, but which are bulky and cumbersome and require considerable storage space mainly by virtue of the fact that these apparatus are equipped with long and unsightly nozzles. Furthermore, in order to control the outwardly flow of the substance treated by the apparatus it has, in the past, been necessary to equip the known devices with more or less complicated flow control arrangements.

Also, there exist in the art treating apparatus which may be provided with one of several different treating members, such as a mixer, a juice extractor head, etc., in which such treating member may readily be removed from or connected to a suitable driving mechanism irrespective of whether this driving mechanism is moving or stationary. Consequently, there exists the great danger that a person will attempt to remove a treating member in order to insert a different treating member into the apparatus at a time when the driving mechanism drives the treating member to be removed. Consequently, severe and painful injury may result when either through foregetfulness or through carelessness one attempts manually to grasp the treating member while the same is being driven by the driving mechanism.

It is, therefore, one of the objects of the present invention to provide a treating apparatus which is free from any of the above disadvantages.

It is another object of the present invention to provide a treating apparatus which comprises a minimum number of parts, which is sturdy, compact and may be mass produced inexpensively.

It is yet another object of the present invention to provide a treating apparatus which dispenses with an unsightly protruding nozzle so that such treating apparatus may readily be stored in a minimum amount of space.

The objects of the present invention also include the provision of a treating apparatus which dispenses with complicated valve or other control means but which is nevertheless capable of controlling the rate at which a substance treated thereby may flow through an outlet.

It is still another object of the present invention to provide a treating apparatus by means of which one of several treating operations, such as beating, mixing, juice extracting, and the like may be performed.

It is a further object of the instant invention to provide a treating apparatus which is adapted to drive any one of several treating elements each of which is suited for a different treating process, which treating apparatus is provided with a suitable mechanism which will prevent removal or exchange of the treating elements at such time as the driving mechanism of the apparatus actually drives the treating element to be removed.

Furthermore, the objects of this invention include the provision of an apparatus of the above type which will give long periods of trouble-free service.

With the above objects in view the present invention mainly consists in a treating apparatus which comprises a container adapted to receive food and having an annular wall portion formed with an outlet and with an outwardly opening recess spaced from the outlet; a support including a means having a seating area tightly engaging the wall portion of the container and being formed with an outlet opening and with a cutout respectively registering with the outlet and with the recess in the annular wall portion of the container, said means of the support including a part for gradually closing the outlet of the container, the container being adapted to be removed from the seating area and to be inserted into the same by movement in axial direction; and stop means movably mounted on the support extending through the cutout therein and being movable between a locking position projecting into the recess and a releasing position retracted from the recess. Thereby, the food container can be removed in axial direction only when the stop means is in releasing position.

Preferably, movable treating means are located in the container, an electric motor for driving the treating means is mounted on the support, and circuit means are connected to the motor and include a switch movable between a circuit breaking position for disconnecting the motor and a circuit closing position. The switch is connected to the stop means for movement therewith in such a manner that when said stop means moves to said releasing position, the switch moves to circuit breaking position for disconnecting the motor during removal and insertion of the container, while the stop means in the locking position prevents insertion of the container into the seating area.

According to one embodiment of the present invention, the container is turnable in the seating area of the support so that the outlet of the container forms with the outlet opening of the seating area of the support a discharge opening when the two outlets are aligned. By turning of the container, the size of the discharge opening can be adjusted, and if the container is sufficiently turned, the two outlets are staggered, and no discharge can take place. The recess which cooperates with the stop means has such circumferential length that its end faces engage the stop means in two positions of the container in which the discharge opening is fully open, or fully closed, respectively.

According to another embodiment of the present invention, the container need not be turnable, but a closure valve is arranged in the outlet in the seating area of the support.

The novel features which are considered as characteristic for the invention are set forth in particular in the appended claims. The invention itself, however, both as to its construction and its method of operation, together with additional objects and advantages thereof, will be best understood from the following description of the specific embodiments when read in connection with the accompanying drawings, in which:

Figure 1:
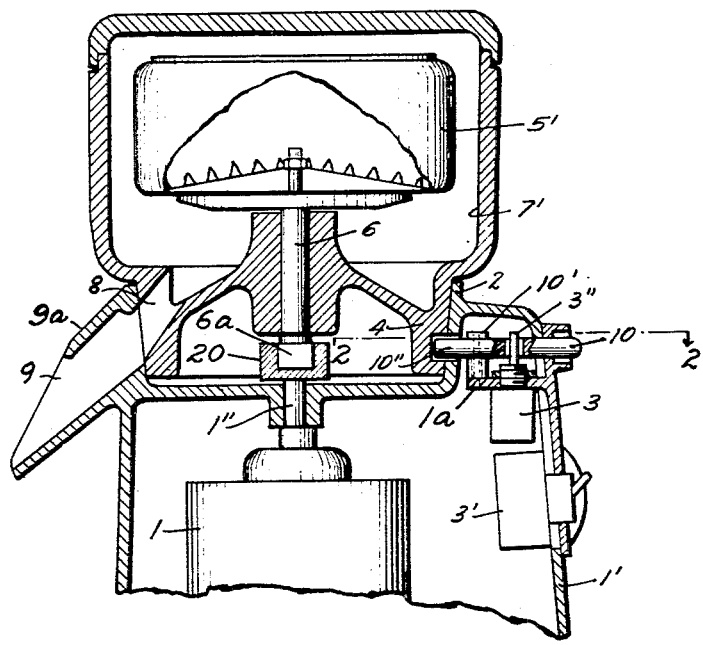
Fig. 1 is a sectional view illustrating one embodiment of the present invention.
Figure 2:
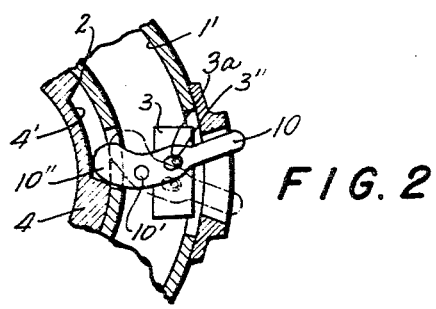
Fig. 2 is a fragmentary cross-sectional view taken on line 2—2 of Fig. 1.

Referring now to the drawings, and particularly to Figs. 1 and 2 the food treating apparatus according to the present invention comprises an electric drive motor 1 which is mounted on a support 1'. The support 1' includes an annular wall portion 2 which defines a frusto-conical seating area. Support 1' has in the wall 2 an outlet opening 9 which cooperates with an outlet 8 in the annular wall 4 of a container 7'. Drive motor 1 has a substantially vertical drive shaft 1". Support 1' supports a manually operable first switch means 3' and a second switch means 3.

These switches may be connected in series circuit connection with each other so as to connect the electric drive motor 1 to a source of electric energy (not shown). It will be understood, therefore, that both switches must be in their closed circuit positions in order to energize the drive motor 1. If desired, the switch means 3' may be of the variable resistance or rheostat type so that the speed of the drive motor 1 may be varied in a manner well known in the art.

The switch means 3 is provided with an actuator 3" which may be moved by a member 10 in a manner described below.

The supporting means 1' is adapted to receive a container 7' which includes annular wall means 4 and has a treating chamber part of which is constituted by the wall means 4.

The container means 7, 7' is provided with an outlet conduit 8 which passes downwardly from the container bottom and through the wall means 4 so as to put the interior of the treating chamber into communication with the exterior thereof, as may readily be seen from the drawing.

The outer surface of the wall means 4 is a sealing surface having a substantially circular frusto-conical configuration and is adapted to be seated within the seating area defined by the wall means 2 of the supporting means 1', the arrangement and dimensions of the wall means 2 and 4 being such that the container 7 is in liquid or fluid-tight relationship with the supporting member 1'. The container member 7' may be turned to different positions relative to supporting member 1' so that the outlets 8 and 9 are in alignment with each other to different extents. These positions include a fully open position in which the passage 8 is in full alignment with outlet conduit 9 to form a discharge passage and a fully closed position in which the passages 8 and 9 are completely out of alignment with each other. The desired degree of alignment of the passages 8 and 9 may be attained by turning the container means 7' relative to the supporting means 1' about their common central axis.

The container 7' supports a treating member 5' which is mounted for rotational movement relative to the receptacle means 7' and which is provided with a shank portion 6. The treating member is illustrated in Fig. 1 as a device which is adapted for juice extraction for citrus or other fruits. It will be understood that in practice any desired treating element may be associated with receptacle means of corresponding configuration.

A coupling means 20 having a square recess is provided for connecting drive shaft 1" of drive motor 1 to a mating portion 6a of the treating member so that the motor will rotate the treating member when the receptacle means is received by the seat defined by the wall means 2 of the supporting means 1'.

It will be understood, therefore, that when the receptacle means 7' is received within the receiving chamber and when the outlet passage 9 and the outlet conduit 8 are at least partially in alignment with each other to form a discharge passage, a substance treated by the treating member within the treating chamber may pass therefrom through the opening 8 and the outlet 9 in the spout 9a to the exterior of the supporting means 1'. A suitable receptacle (not shown) into which the substance may flow may be positioned beneath the outermost portion of the outlet spout 9a.

It will further be understood that the degree of alignment of the opening means 8 and 9 will control the rate at which the substance may leave the treating chamber. If, for example, the outlets 8 and 9 are fully aligned a substance may flow through the discharge openings 8 and 9 at a maximum rate, and if the outlets 8 and 9 are completely out of alignment with each other the substance within the treating chamber will be prevented from leaving the same entirely. If the container means 7' and the supporting means 1' occupy a certain intermediate position relative to each other wherein the opening means 8 and 9 are in partial alignment with each other, the rate at which the substance may flow out of the treating chamber will be a function of the degree of alignment of these opening means.

Figure 3:
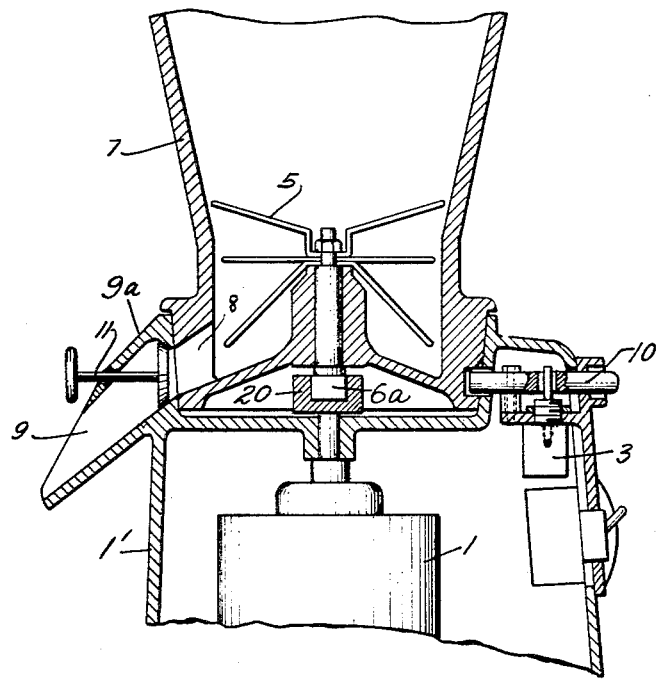
Fig. 3 is a sectional view of a modified embodiment of the present invention.

The embodiment illustrated in Fig. 3 is similar to the embodiment of Fig. 1 in the general construction, and consequently corresponding elements are indicated by the same reference numerals. A valve 11 is provided for closing the outlet opening 9 and mounted on the spout in which the outlet opening 9 is located. It will be understood that if closure valve 11 is provided, it is not necessary to turn container 7 for closing the discharge passage. Fig. 3 illustrates a different kind of food treating device 5 which may be a beating, mixing, or cutting element.

According to the present invention a combined fastening and control member 10 is provided for engaging the receptacle means and fastening the same to the supporting means 1' when the receptacle means is received by the receiving chamber. The member 10 is pivotally mounted on a stud 10' which is supported on a ledge 1a integral with the supporting means 1'. The member 10 has at one free end thereof an engaging portion 10" and is movable between a locking position wherein the engaging portion extends into the recess 4' and a retracted releasing position wherein the member 10, including the engaging portion 10", is exterior of the recess 4'.

The member 10 is also formed with an elongated slot 3a through which protrudes the switch actuator 3" so that the switch 3 may be moved between its open and closed circuit conditions upon pivotal movement of the member 10 about the stud 10'. The switch structure is such that when the member 10 is in its protruding position, i.e., the position shown in solid lines in Fig. 2, the switch 3 is in its closed circuit or on position, and when the member 10 is in its retracted position, shown in dotted lines in Fig. 2, the switch 3 is in its open circuit or off position.

The wall means 4 is formed at the outer surface thereof with an elongated peripheral slot or recess 4' which may best be seen in Fig. 2. The position of the recess 4' is such that when the receptacle means is received by the receiving chamber of the supporting means 1 the engaging portion 10" of the member 10 will, when the latter is in its protruding position, extend into the recess 4' to prevent axial movement of container 7' relative to the supporting means 1'. The elongated peripheral recess 4' is at least as long as the peripheral width of the opening 8 so that the engaging portion 10" may protrude into the recess 4' when the receptacle 7' is in any of its positions relative to the supporting means 1' in which the outlets 8 and 9 are either at least partially in alignment with each other or just out of alignment with each other. In other words, the peripheral recess 4' is long enough so that the receptacle 7' may be turned relative to the supporting means 1' so as to obtain any desired degree of alignment between the outlets 8 and 9 without the engaging portion 10" interfering with such turning.

It will be seen, therefore, that when the member 10 is in its protruding position illustrated in solid lines in Fig. 2, it will fasten the receptacle 7' to the supporting means 1' so that the receptacle 7' cannot be withdrawn or removed from the receiving portion defined by the wall means 2. Also, when the receptacle 7' is removed and the member 10 is in its protruding position, the engaging portion 10" of the member 10 will prevent insertion of the receptacle into the receiving chamber. It follows, therefore, that the receptacle 7' can be inserted into or removed from the receiving chamber only when the member 10 is in its retracted position, shown in dotted lines in Fig. 2.

As was pointed out above, the switch means 3 must be in its closed circuit condition so that the drive motor 1 may be electrically connected to a source of electric energy. It follows, therefore, that the members 3 and 10 together constitute an interlock or combined fastening and switch means which is movable between (*a*) a combined protruding and closed circuit position wherein the engaging portion 10" protrudes into the recess 4' so as to engage the receptacle 7' and fasten the same to the supporting means 1' thereby preventing removal of the receptacle means from the receiving chamber, and insertion of the receptacle means into the seating area of wall 2, and in which combined protruding and closed circuit position the drive motor may be connected to a source of electric energy, and (*b*) a combined retracted and open circuit position wherein the engaging portion 10" is located outside of the recess 4' so that the receptacle means may readily be inserted and removed and wherein the drive member is at all times disconnected from the source of electric energy. Consequently, the receptacle may be inserted into and removed from the receiving chamber only when the combined fastening and switch means 3, 10 is in its combined retracted and open circuit position so that the drive motor will be disconnected from the source of electric energy and movement of the treating member by the drive motor be prevented during insertion of the receptacle member into or removal thereof from the receiving seating area of the supporting member 1'. If desired, suitable biasing means may be provided for urging member 10 into either or both of its positions.

It will be understood that each of the elements described above, or two or more together, may also find a useful application in other types of treating apparatus differing from the types described above.

While the invention has been illustrated and described as embodied in treating apparatus for kitchen use, it is not intended to be limited to the details shown, since various modifications and structural changes may be made without departing in any way from the spirit of the present invention.

Without further analysis, the foregoing will so fully reveal the gist of the present invention that others can by applying current knowledge readily adapt it for various applications without omitting features that, from the standpoint of prior art, fairly constitute essential characteristics of the generic or specific aspects of this invention, and, therefore, such adaptations should and are intended to be comprehended within the meaning and range of equivalence of the following claims.

What is claimed as new and desired to be secured by Letters Patent is:

1. Food treating apparatus comprising, in combination, a container adapted to receive food and having an annular wall portion formed with an outlet and with an outwardly opening recess spaced from said outlet; a support including a means having a seating area tightly engaging said wall portion of said container and being formed with an outlet opening and with a cutout respectively registering with said outlet and with said recess in said annular wall portion of said container, said container being adapted to be removed from said seating area and to be inserted into the same by movement in axial direction; stop means movably mounted on said support means extending through said cutout therein and being movable between a locking position projecting into said recess and releasing position retracted from said recess; movable treating means located in said container; an electric motor for driving said treating means being mounted on said support; circuit means connected to said motor and including a switch movable between a circuit breaking position for disconnecting said motor and a circuit closing position, said switch being connected to said stop means for movement therewith in such a manner that when said stop means moves to said releasing position, said switch moves to circuit breaking position for disconnecting said motor during removal and insertion of said container while said stop means in said locking position prevents insertion of a container into said seating area.

2. Food-treating apparatus comprising, in combination, support means including a wall portion defining a seating area, said wall portion being formed with a first outlet opening and a cutout; a container adapted to receive treated food in the interior thereof and having a wall portion formed with a second outlet opening, said wall portion being formed with an outwardly opening recess extending therein a predetermined distance in circumferential direction and spaced from said second outlet opening, said container being seated in said seating area of said support means for turning movement relative thereto and adapted to be removed therefrom in an axial direction, said wall portion of said container being fluid-tightly engaged by said wall portion of said seating area of said support means, said container being turnable relative to said support means between a first position in which said second outlet opening is fully aligned with said first outlet opening forming a common discharge opening permitting discharge of food from said container and a second position in which said second and said first outlet openings are spaced from each other in circumferential direction thereby preventing discharge of food from said container, said container being turnable to a plurality of intermediate positions in which said first and second outlet openings overlap to gradually vary the size of said common discharge opening permitting controllable discharge of food from said container said cutout and said recess registering in said positions of said container; stop means movably mounted on said support extending through said cutout in the wall portion thereof, said stop means being movable between one locking position in which it projects into said recess to permit said turning movement of the container while preventing axial displacement thereof and another position retracted from said recess; treating means mounted on said support and located in said container; an electric motor for driving said treating means; and circuit means connected to said motor and including a switch movable between one disconnecting position in which it disconnects the motor and another position in which it energizes the motor and connected with said stop means in such a manner that when the stop means moves into said other position said switch is moved to said one disconnecting position so that said motor is disconnected during removal and insertion of the container into the seating area of the support.

3. Food-treating apparatus comprising, in combination, support means including a wall portion defining a seating area, said wall portion being formed with a first outlet opening and a cutout; a container adapted to receive treated food in the interior thereof and having a wall portion formed with a second outlet opening of predetermined width, said wall portion being formed with an outwardly opening recess extending in circumferential direction and being bounded by two end faces, said container being seated in said seating area of said support means for turning movement relative thereto and adapted to be removed therefrom in an axial direction, said wall portion of said container being fluid-tightly engaged by said wall portion of said seating area of said support means, said container being turnable relative to said support means between a first position in which said second outlet opening is fully aligned with said first outlet opening forming a common discharge opening permitting discharge of food from said container and a second position in which said second and said first outlet openings are spaced from each other in circumferential direction thereby preventing discharge of food from said container, said container being turnable to a plurality of intermediate positions in which said first and second outlet openings overlap to gradually vary the size of said common discharge opening permitting controllable discharge of food from said container, said cutout and said recess registering in said positions of said container; and a stop lever pivotally mounted on said support extending through said cutout in the wall portion thereof, said stop lever being movable between one locking position in which it projects into said recess of said container preventing axial displacement thereof and another position retracted from said recess, said stop lever engaging one of said end faces in said first position of said container and engaging the other end face in said second position of said container and thereby limiting turning movement of said container.

4. Food-treating apparatus comprising, in combination, support means including a wall portion defining a seating area, said wall portion being formed with a first outlet opening and a cutout; a container adapted to receive treated food in the interior thereof and having a wall portion formed with a second outlet opening of predetermined width, said wall portion being formed with an outwardly opening recess extending in circumferential direction and being bounded by two end faces, said container being seated in said seating area of said support means for turning movement relative thereto and adapted to be removed therefrom in an axial direction, said wall portion of said container being fluid-tightly engaged by said wall portion of said seating area of said support means, said container being turnable relative to said support means between a first position in which said second outlet opening is fully aligned with said first outlet opening forming a common discharge opening permitting discharge of food from said container and a second position in which said second and said first outlet openings are spaced from each other in circumferential direction thereby preventing discharge of food from said container, said container being turnable to a plurality of intermediate positions in which said first and second outlet openings overlap to gradually vary the size of said common discharge opening permitting controllable discharge of food from said container, said cutout and said recess registering in said positions of said container; a stop lever pivotally mounted on said support extending through said cutout in the wall portion thereof, said stop lever being movable between one locking position in which it projects into said recess of said container preventing axial displacement thereof and another position retracted from said recess, said stop lever engaging one of said end faces in said first position of said container and engaging the other end face in said second position of said container and thereby limiting turning movement of said container; treating means mounted on said support and located in said container; an electric motor for driving said treating means; and circuit means connected to said motor and including a switch movable between one disconnecting position in which it disconnects the motor and another position in which it energizes the motor and connected with said stop lever in such a manner that when the stop lever moves into said other position said switch is moved to said one disconnecting position so that said motor is disconnected during removal and insertion of the container into the seating area of the support.

5. Food-treating apparatus as set forth in claim 4 wherein said recess extends in said circumferential direction in said container for a distance at least as great as the predetermined width of said second outlet opening.

6. Food treating apparatus comprising, in combination, a container member adapted to receive food and having an annular wall portion formed with an outlet and with an outwardly opening recess spaced from said outlet; a support member including an annular means having a seating area tightly engaging said wall portion of said container and being formed with an outlet opening and with a cutout respectively registering with said outlet and with said recess in said annular wall portion of said container member, said outlet opening and said outlet forming together a discharge passage; a valve means mounted on one of said members and located in said discharge passage, said container member being adapted to be removed from said seating area and to be inserted into the same by movement in axial direction; stop means movably mounted on said annular means extending through said cutout therein and being movable between a locking position projecting into said recess and releasing position retracted from said recess; movable treating means located in said container member; an electric motor for driving said treating means being mounted on said support member; circuit means connected to said motor and including a switch movable between a circuit breaking position for disconnecting said motor and a circuit closing position, said switch being connected to said stop means for movement therewith in such a manner that when said stop means moves to said releasing position said switch moves to circuit breaking position for disconnecting said motor during removal and insertion of said container member while said stop means in said locking position prevents insertion of a container member into said seating area.

7. Food treating apparatus comprising, in combination, a container adapted to receive food and having an annular wall portion formed with an outlet and with an outwardly opening recess spaced from said outlet; a support including an annular means having a seating area tightly engaging said wall portion of said container and being formed with an outlet opening and with a cutout respectively registering with said outlet and with said recess in said annular wall portion of said container, a valve for gradually closing said outlet opening of said annular means, said container being adapted to be removed from said seating area and to be inserted into the same by movement in axial direction; stop means movably mounted on said support means extending through said cutout therein and being movable between a locking position projecting into said recess and a releasing position retracted from said recess; movable treating means located in said container; an electric motor for driving said treating means being mounted on said support; circuit means connected to said motor and including a switch movable between a circuit breaking position for disconnecting said motor and a circuit closing position, said switch being connected to said stop means for movement therewith in such a manner that when said stop means moves to said releasing position said switch moves to circuit breaking position for disconnecting said motor during removal and insertion of said container while said stop means in said locking position prevents insertion of a container into said seating area.

References Cited in the file of this patent

UNITED STATES PATENTS

| | | |
|---|---|---|
| 746,681 | Darragh | Dec. 15, 1903 |
| 770,763 | Lyhne et al. | Sept. 27, 1904 |
| 1,974,501 | Marty | Sept. 25, 1934 |
| 2,002,333 | Strauss | May 21, 1935 |
| 2,284,456 | Stoddard | May 26, 1942 |
| 2,315,018 | Lawrence | Mar. 30, 1943 |
| 2,550,303 | Simpson | Apr. 24, 1951 |

FOREIGN PATENTS

| | | |
|---|---|---|
| 837,452 | Germany | Apr. 28, 1952 |